(12) United States Patent
Okuma

(10) Patent No.: US 11,428,520 B2
(45) Date of Patent: Aug. 30, 2022

(54) DISTANCE MEASUREMENT UNIT AND LIGHT IRRADIATION DEVICE

(71) Applicant: HAMAMATSU PHOTONICS K.K., Hamamatsu (JP)

(72) Inventor: Junji Okuma, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 148 days.

(21) Appl. No.: 17/040,800

(22) PCT Filed: Dec. 21, 2018

(86) PCT No.: PCT/JP2018/047348
§ 371 (c)(1),
(2) Date: Sep. 23, 2020

(87) PCT Pub. No.: WO2019/187422
PCT Pub. Date: Oct. 3, 2019

(65) Prior Publication Data
US 2021/0010803 A1    Jan. 14, 2021

(30) Foreign Application Priority Data
Mar. 30, 2018    (JP) .............................. JP2018-067405

(51) Int. Cl.
*G01B 11/02*     (2006.01)
*G01B 11/14*     (2006.01)
(Continued)

(52) U.S. Cl.
CPC ............ *G01B 11/026* (2013.01); *B23K 26/03* (2013.01); *G01B 11/0608* (2013.01); *G01B 11/14* (2013.01); *G02B 7/102* (2013.01)

(58) Field of Classification Search
CPC ......... G02B 7/102; B23K 26/03; G01S 17/08; G01C 3/00; G01C 3/06; G01C 3/08;
(Continued)

(56) References Cited

U.S. PATENT DOCUMENTS

2019/0078875 A1*  3/2019  Chida ................... G02B 13/22
2021/0180950 A1*  6/2021  Murata ............... G02B 27/0025

FOREIGN PATENT DOCUMENTS

AU    2015101098 A4    9/2015
CN       1720117 A     1/2006
(Continued)

OTHER PUBLICATIONS

International Preliminary Report on Patentability dated Oct. 15, 2020 for PCT/JP2018/047348.

*Primary Examiner* — Gordon J Stock, Jr.
(74) *Attorney, Agent, or Firm* — Faegre Drinker Biddle & Reath LLP

(57) ABSTRACT

A distance measurement unit includes: a distance measurement light source that outputs distance measurement light; an objective lens through which the distance measurement light and reflected light are transmitted; an imaging lens through which the reflected light is transmitted and which forms an image at an imaging position; an optical path adjustment unit that adjusts an optical path of the reflected light; and a light detection unit that detects the reflected light. The objective lens allows the distance measurement light to be transmitted therethrough in a state in which an optical path of the distance measurement light is spaced apart from a central axis of the objective lens. The optical path adjustment unit adjusts the optical path so that the imaging position of the reflected light approaches a predetermined plane. A light reception surface of the light detection unit is located to follow along the predetermined plane.

7 Claims, 9 Drawing Sheets

(51) Int. Cl.
*G02B 7/10* (2021.01)
*G01B 11/06* (2006.01)
*B23K 26/03* (2006.01)

(58) Field of Classification Search
CPC .... G01C 5/00; G01B 11/026; G01B 11/0608; G01B 11/22; G01B 11/24; G01B 11/30; G01B 11/303; G01B 11/306
See application file for complete search history.

(56) References Cited

FOREIGN PATENT DOCUMENTS

| | | | |
|---|---|---|---|
| CN | 1844847 A | 10/2006 | |
| CN | 101226892 A | 7/2008 | |
| CN | 102313519 A | 1/2012 | |
| CN | 102822620 A | 12/2012 | |
| CN | 206622750 U | 11/2017 | |
| JP | S59-188931 A | 10/1984 | |
| JP | H4-221705 A | 8/1992 | |
| JP | H6-288835 A | 10/1994 | |
| JP | 2005-045164 A | 2/2005 | |
| JP | 2008-170366 A | 7/2008 | |
| JP | 2010-223822 A | 10/2010 | |
| JP | 5743123 B1 | 7/2015 | |
| KR | 20140141455 A * | 10/2014 | |
| WO | WO-2007/018118 A1 | 2/2007 | |
| WO | WO-2016002443 A1 * | 1/2016 | ............. G01B 11/00 |

* cited by examiner (a)

(b)

(a)

(b)

(a)

(b)

DISTANCE MEASUREMENT UNIT AND LIGHT IRRADIATION DEVICE

TECHNICAL FIELD

The present disclosure relates to a distance measurement unit and a light irradiation device.

BACKGROUND ART

As a distance measurement unit for measuring a height of a front surface of an object, a distance measurement unit using an astigmatism method is known (for example, refer to Patent Literature 1). In the astigmatism method, laser light emitted from a light source is condensed to an objective lens, and the front surface of the object is irradiated with the laser light. In addition, reflected light of the laser light reflected from the front surface of the object propagates on an optical axis of the objective lens, astigmatism occurs, and the reflected light is detected, for example, by a four-division photodiode.

CITATION LIST

Patent Literature

Patent Literature 1: Japanese Patent No. 5743123

SUMMARY OF INVENTION

Technical Problem

In the astigmatism method described above, for example, in the case of measuring a height of a front-side main surface of a wafer, reflected light of laser light reflected from a rear-side main surface of the wafer is superimposed on reflected light of the laser light reflected from the front-side main surface of the wafer. As a result, there is a concern that the height of the front-side main surface of the wafer cannot be measured with accuracy.

An object of the present disclosure is to provide a distance measurement unit and a light irradiation device which are capable of measuring a height of a surface to be measured of an object with accuracy.

Solution to Problem

According to an aspect of the present disclosure, there is provided a distance measurement unit including: a distance measurement light source that outputs distance measurement light that is laser light; an objective lens through which the distance measurement light and reflected light are transmitted, the reflected light being the distance measurement light reflected from a surface to be measured of an object; an imaging lens through which the reflected light is transmitted and which forms an image at an imaging position, the image being an image at a position at which the distance measurement light or the reflected light is condensed by the objective lens; an optical path adjustment unit that adjusts an optical path of the reflected light; and a light detection unit that detects the reflected light. The objective lens allows the distance measurement light to be transmitted therethrough to the object side in a state in which an optical path of the distance measurement light is spaced apart from a central axis of the objective lens. The optical path adjustment unit adjusts the optical path of the reflected light so that the imaging position of the reflected light that is imaged in at least one direction orthogonal to an incidence direction of the reflected light incident to the light detection unit approaches a predetermined plane that intersects the incidence direction. A light reception surface of the light detection unit is located to follow along the predetermined plane.

In the distance measurement unit, the objective lens allows the distance measurement light to be transmitted therethrough to the object side in a state in which the optical path of the distance measurement light is spaced apart from the central axis of the objective lens. According to this, a position at which reflected light reflected from the surface to be measured of the object is incident to the light reception surface of the light detection unit varies in correspondence with the height of the surface to be measured of the object. Accordingly, it is possible to measure the height of the surface to be measured of the object on the basis of an incidence position of the reflected light on the light reception surface of the light detection unit. At this time, even when a part of the distance measurement light is reflected from another surface of the object, reflected light reflected from the other surface of the object is spatially separated from the reflected light reflected form the surface to be measured of the object, and thus it is possible to suppress unnecessary reflected light from being superimposed on the reflected light to be detected. In addition, in the distance measurement unit, the optical path adjustment unit adjusts the optical path of the reflected light so that the imaging position of the reflected light that is imaged in at least one direction orthogonal to the incidence direction of the reflected light incident to the light detection unit approaches a predetermined plane that intersects the incidence direction, and the light reception surface of the light detection unit is located to follow along the predetermined plane. According to this, the height of the surface to be measured of the object can be measured in a uniform state. When the optical path adjustment unit is not provided, since a position at which the reflected light is transmitted through each of the objective lens and the imaging lens varies in correspondence with the height of the surface to be measured of the object, the position at which the reflected light is imaged by the imaging lens greatly varies in correspondence with the height of the surface to be measured of the object. As a result, there is a concern that the height of the surface to be measured of the object cannot be measured with accuracy depending on the height. As described above, according to the distance measurement unit, the height of the surface to be measured of the object can be measured with accuracy.

In the distance measurement unit according to the aspect of the present disclosure, the optical path adjustment unit may adjust the optical path of the reflected light between the imaging lens and the light detection unit. According to this, respective configurations can be arranged with efficiency.

In the distance measurement unit according to the aspect of the present disclosure, the optical path adjustment unit may be a reflective grating including a plurality of grooves extending along a direction that is parallel to the light reception surface and orthogonal to the one direction. According to this, it is possible to make the imaging position of the reflected light imaged in at least one direction orthogonal to the incidence direction of the reflected light incident to the light detection unit be close to a predetermined plane that intersects the incidence direction in an easy and reliable manner.

In the distance measurement unit according to the aspect of the present disclosure, the light detection unit may include a plurality of light detection channels arranged along a direction parallel to the one direction. According to this, the reflected light is imaged in at least one direction orthogonal to the incidence direction, and thus the height of the surface to be measured of the object can be measured with accuracy on the basis of the position of the light detection channels to which the reflected light is incident.

In the distance measurement unit according to the aspect of the present disclosure, the objective lens and the imaging lens may be configured so that a direction of the optical path of the reflected light emitted from the imaging lens becomes constant. According to this, a relationship between the height of the surface to be measured of the object and the position of the light detection channels to which the reflected light is incident can be made to be linear.

In the distance measurement unit according to the aspect of the present disclosure, an image of the reflected light on the light reception surface may show an elongated shape in which a direction orthogonal to the one direction is set as a longitudinal direction. According to this, a deviation of the light reception surface of the light detection unit in the longitudinal direction of the image of the reflected light can be permitted, and thus the height of the surface to be measured of the object can be measured with accuracy while mitigating arrangement accuracy of respective configurations.

According to another aspect of the present disclosure, there is provided a light irradiation device including: a support unit that supports an object; an irradiation light source that outputs irradiation light; a distance measurement light source that outputs distance measurement light that is laser light; an optical element through which one side of the irradiation light and the distance measurement light is transmitted and from which the other side of the irradiation light and the distance measurement light is reflected; an objective lens through which the irradiation light, the distance measurement light, and reflected light are transmitted, the reflected light being the distance measurement light reflected from a surface to be measured of the object; an imaging lens through which the reflected light is transmitted and which forms an image at an imaging position, the image being an image at a position at which the distance measurement light or the reflected light is condensed by the objective lens; an optical path adjustment unit that adjusts an optical path of the reflected light; a light detection unit that detects the reflected light; a drive unit that moves the objective lens along a central axis of the objective lens; and a controller that drives the drive unit on the basis of an electrical signal output from the light detection unit.

The objective lens allows the distance measurement light to be transmitted therethrough to the object side in a state in which an optical path of the distance measurement light is spaced apart from the central axis of the objective lens. The optical path adjustment unit adjusts the optical path of the reflected light so that the imaging position of the reflected light that is imaged in at least one direction orthogonal to an incidence direction of the reflected light incident to the light detection unit approaches a predetermined plane that intersects the incidence direction. A light reception surface of the light detection unit is located to follow along the predetermined plane.

According to the light irradiation device, as described above, the height of the surface to be measured of the object can be measured with accuracy. In addition, the objective lens is moved along a central axis thereof in correspondence with the height of the surface to be measured of the object, and thus a condensing point of the irradiation light can match a desired position in the object. In addition, measurement of the height of the surface to be measured of the object and positioning of a condensing point of irradiation light with respect to the object can be performed without limitation to a state in which a condensing point of the distance measurement light by the objective lens is located on the surface to be measured of the object.

Advantageous Effects of Invention

According to the present disclosure, it is possible to provide a distance measurement unit and a light irradiation device which are capable of measuring a height of a surface to be measured of an object with accuracy.

DESCRIPTION OF EMBODIMENTS

Figure 1:
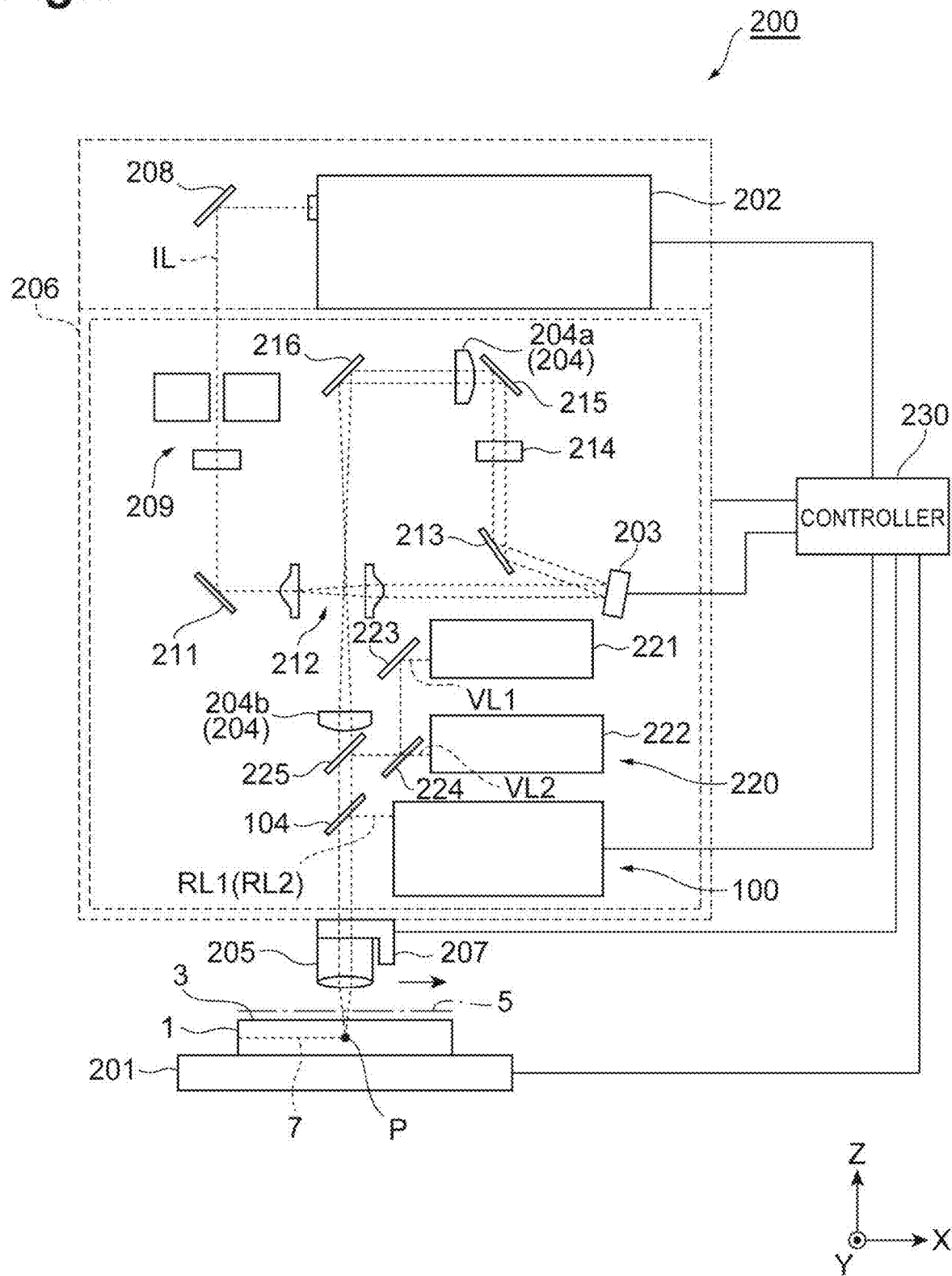
FIG. 1 is a configuration diagram of a laser processing device that is a light irradiation device according to an embodiment.

Hereinafter, an embodiment of the present disclosure will be described in detail with reference to the accompanying drawings. Note that, the same reference numeral will be given to the same or corresponding portion in the respective drawings, and redundant description will be omitted.

[Configuration of Laser Processing Device]

As illustrated in FIG. 1, a laser processing device 200 is a light irradiation device that irradiates the inside of an object to be processed (object) 1 with laser light (irradiation light) IL in conformity to a condensing point P along a planned cutting line 5 to form a modified region 7 in the object to be processed 1 along the planned cutting line 5. For example, the object to be processed 1 is a semiconductor wafer in which a plurality of functional elements are formed in a matrix shape. In this case, the planned cutting line 5 is set in a lattice shape to pass between adjacent functional elements. The modified region 7 is a region in which physical characteristics such as density, a refractive index, and mechanical strength are different from those of the periphery.

When the modified region 7 is formed in the object to be processed 1 along the planned cutting line 5, a fracture is extended from the modified region 7 in a thickness direction of the object to be processed 1, and thus the object to be processed 1 can be cut along the planned cutting line 5. Note that, to form the modified region 7 inside the object to be processed 1, the laser light IL may be emitted in a condition that the laser light IL is transmitted through a front surface (surface to be measured) 3 of the object to be processed 1, and is particularly absorbed in the vicinity of the condensing point P.

The laser processing device 200 includes a stage (support unit) 201, a laser light source (irradiation light source) 202, a reflective spatial light modulator 203, a $4f$ optical system 204, and an objective lens 205. In the following description, one direction in a horizontal direction is referred to as an X-axis direction, one direction in a horizontal direction orthogonal to the X-axis direction is referred to as a Y-axis direction, and a vertical direction is referred to as a Z-axis direction.

The stage 201 supports the object to be processed 1. The stage 201 is movable in each direction of the X-axis direction, the Y-axis direction, and the Z-axis direction in a state of holding the object to be processed 1. The laser light source 202 outputs the laser light IL. The laser light source 202 is attached to a top plate of a housing 206. For example, the laser light source 202 is a fiber laser. Here, the laser light source 202 emits the laser light IL to one side along the X-axis direction.

The reflective spatial light modulator 203 modulates the laser light IL output from the laser light source 202. The reflective spatial light modulator 203 is provided inside the housing 206. For example, the reflective spatial light modulator 203 is a liquid crystal on silicon (LCOS)-spatial light modulator (SLM). Here, the reflective spatial light modulator 203 reflects the laser light IL, which is incident along the X-axis direction, obliquely upward.

The $4f$ optical system 204 suppresses a wavefront shape of the laser light IL modulated by the reflective spatial light modulator 203 from being changed by spatial propagation. The $4f$ optical system 204 is provided inside the housing 206.

The $4f$ optical system 204 includes a first lens 204$a$ and a second lens 204$b$. In the $4f$ optical system 204, an optical path length between the reflective spatial light modulator 203 and the first lens 204$a$ equals to a focal length of the first lens 204$a$, an optical path length between the objective lens 205 and the second lens 204$b$ equals to a focal length of the second lens 204$b$, an optical path length between the first lens 204$a$ and the second lens 204$b$ equals to the sum of the focal lengths of the first lens 204$a$ and the second lens 204$b$, and the first lens 204$a$ and the second lens 204$b$ constitutes a double-telecentric optical system.

The objective lens 205 condenses the laser light IL modulated by the reflective spatial light modulator 203. The objective lens 205 is constituted by a plurality of lenses. The objective lens 205 is attached to a bottom plate of the housing 206 through a drive unit 207 including a piezoelectric element and the like. The drive unit 207 moves the objective lens 205 along a central axis thereof (here, the Z-axis direction). Note that, the objective lens 205 may be constituted by one lens.

In the laser processing device 200, the laser light IL output from the laser light source 202 is reflected to a lower side along the Z-axis direction by the mirror 208, and enters the inside of the housing 206. The intensity of the laser light IL entered the inside of the housing 206 is adjusted by an attenuator 209, and is reflected to the other side along the X-axis direction by a mirror 211. A beam diameter of the laser light IL reflected by the mirror 211 is enlarged by a beam expander 212, and the laser light IL is modulated and reflected by the reflective spatial light modulator 203.

The laser light IL modulated and reflected by the reflective spatial light modulator 203 is reflected upward along the Z-axis direction by a mirror 213, and a polarization direction of the laser light IL is adjusted by $\lambda/2$ wavelength plate 214. The laser light IL of which the polarization direction is adjusted is reflected to one side along the X-axis direction by a mirror 215, is transmitted through the first lens 204$a$ of the $4f$ optical system 204, and is reflected downward along the Z-axis direction by a mirror 216. The laser light IL reflected by the mirror 216 is transmitted through the second lens 204$b$ of the $4f$ optical system 204, and is incident to the objective lens 205.

In the laser processing device 200, a visible light source 221, a light detection unit 222, a mirror 223, a dichroic mirror 224, a dichroic mirror 225, and the objective lens 205 constitute an observation unit 220 for observing a front surface 3 of the object to be processed 1. The visible light source 221, the light detection unit 222, the mirror 223, the dichroic mirror 224, and the dichroic mirror 225 are provided inside the housing 206.

Visible light VL1 output from the visible light source 221, is sequentially reflected by the mirror 223, the dichroic mirror 224, and the dichroic mirror 225, and is incident to the objective lens 205. The visible light VL1 incident to the objective lens 205 is condensed by the objective lens 205, and is emitted to the front surface 3 of the object to be processed 1. Reflected light VL2 of the visible light VL1 reflected from the front surface 3 of the object to be processed 1 is transmitted through the objective lens 205, and is reflected by the dichroic mirror 225. The reflected light VL2 reflected by the dichroic mirror 225 is transmitted through the dichroic mirror 224, is incident to the light detection unit 222, and is detected by the light detection unit 222. Note that, the dichroic mirror 225 is disposed between the second lens 204$b$ of the $4f$ optical system 204 and the objective lens 205, and allows the laser light IL to be transmitted therethrough.

In the laser processing device 200, a distance measurement unit 100 is constituted (details thereof will be described later). The distance measurement unit 100 measures a height of the front surface 3 of the object to be processed 1 supported to the stage 201. The height of the front surface 3 of the object to be processed 1 is a position of the front surface 3 of the object to be processed 1 in a direction (here, the Z-axis direction) parallel to the central axis of the objective lens 205, and corresponds to, for example, a distance between the objective lens 205 and the front surface 3 of the object to be processed 1.

The laser processing device 200 includes a controller 230. For example, the controller 230 is constituted by a computer including a central processing unit (CPU), a read only memory (ROM), a random access memory (RAM), and the like. The controller 230 executes various kinds of control by executing a predetermined program in the computer.

As an example, the controller 230 controls the laser light source 202 so that a pulse width and the like of the laser light IL output from the laser light source 202 become predetermined values. In addition, when forming the modified region 7, the controller 230 controls the stage 201 so that the condensing point P of the laser light IL is located on an inner side by a predetermined distance from the front surface 3 of the object to be processed 1, and the condensing point P of the laser light IL relatively moves along the planned cutting line 5. In addition, the controller 230 controls the reflective spatial light modulator 203 so that the wavefront shape of the laser light IL becomes a predetermined shape.

In addition, when forming the modified region 7, the controller 230 controls the drive unit 207 on the basis of the height of the front surface 3 of the object to be processed 1 which is measured by the distance measurement unit 100 (that is, on the basis of an electrical signal output from a light detection unit 107 to be described later (refer to FIG. 2)) so that the condensing point P of the laser light IL is located on an inner side by a predetermined distance from the front surface 3 of the object to be processed 1, and moves the objective lens 205 along a central axis thereof. According to this, even when the height of the front surface 3 of the object to be processed 1 varies along the planned cutting line 5, the modified region 7 can be formed on an inner side by a predetermined distance from the front surface 3 of the object to be processed 1.

[Configuration of Distance Measurement Unit]

Figure 2:
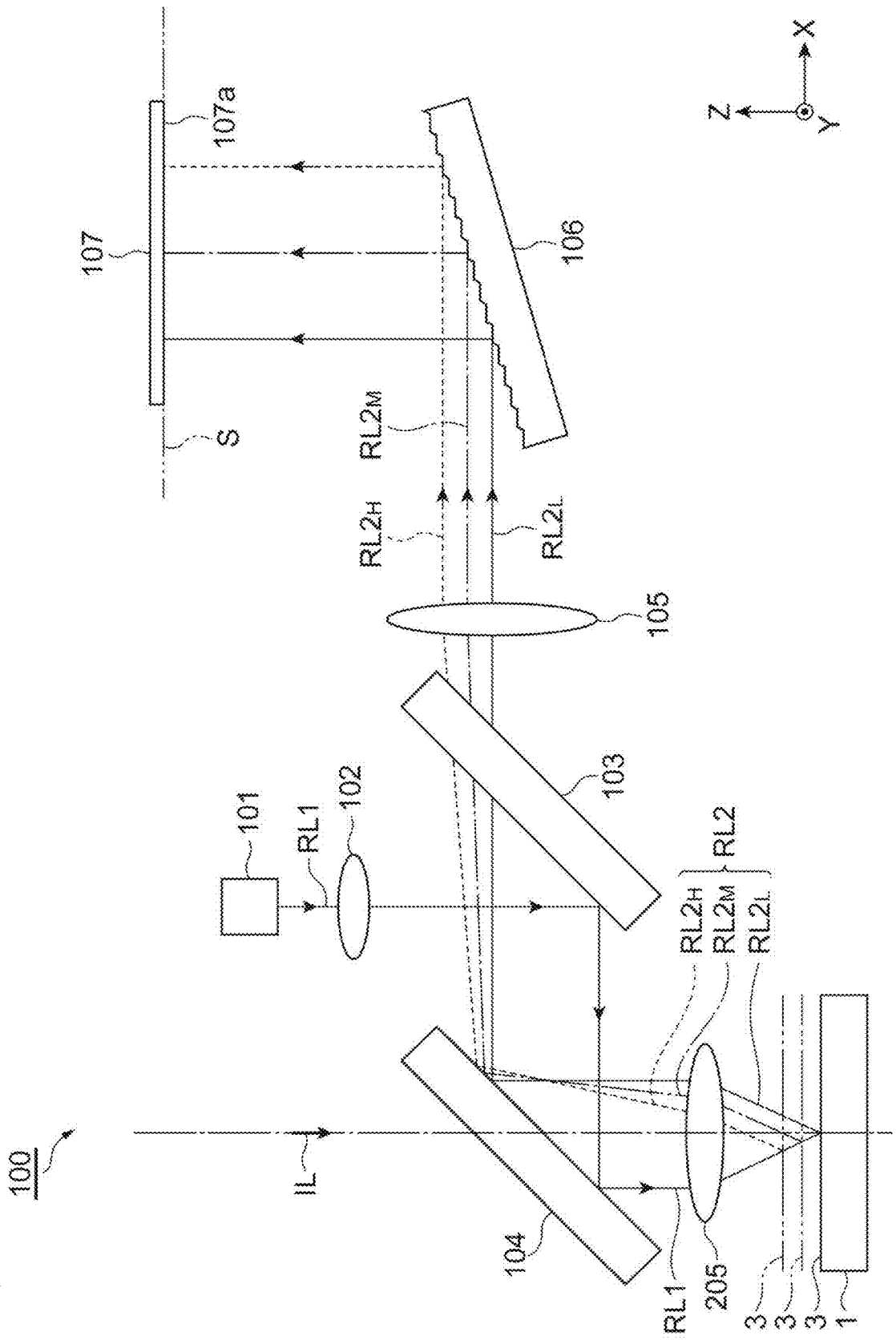
FIG. 2 is a configuration diagram of a distance measurement unit provided in the laser processing device illustrated in FIG. 1.

As illustrated in FIG. 2, the distance measurement unit 100 includes a distance measurement light source 101, a collimate lens 102, a half mirror 103, a dichroic mirror (optical element) 104, an imaging lens 105, a reflective grating (optical path adjustment unit) 106, a light detection unit 107, and an objective lens 205. The distance measurement light source 101, the collimate lens 102, the half mirror 103, the dichroic mirror 104, the imaging lens 105, the reflective grating 106, and the light detection unit 107 are provided in the housing 206.

The distance measurement light source 101 outputs distance measurement light RL1 that is laser light. For example, the distance measurement light source 101 is a laser diode. Here, the distance measurement light source 101 emits distance measurement light RL1 to a lower side along the Z-axis direction. The collimate lens 102 collimates the distance measurement light RL1 output from the distance measurement light source 101.

The half mirror 103 reflects the distance measurement light RL1 collimated by the collimate lens 102 to the dichroic mirror 104 side. In addition, the half mirror 103 allows reflected light RL2 to be described later to be transmitted therethrough from the dichroic mirror 104 side to the imaging lens 105 side. Here, the half mirror 103 reflects the distance measurement light RL1 incident from an upper side along the Z-axis direction to one side along the X-axis direction, and allows the reflected light RL2 to be transmitted therethrough from the one side to the other side along the X-axis direction.

The dichroic mirror 104 reflects the distance measurement light RL1 reflected by the half mirror 103 to the objective lens 205 side. In addition, the dichroic mirror 104 reflects the reflected light RL2 incident from the objective lens 205 side to the half mirror 103 side. Here, the dichroic mirror 104 reflects the distance measurement light RL1 incident from the other side along the X-axis direction to a lower side along the Z-axis direction, and reflects the reflected light RL2 incident from the lower side along the Z-axis direction to the other side along the X-axis direction. Note that, the dichroic mirror 104 is disposed between the dichroic mirror 225 of the observation unit 220 and the objective lens 205 (refer to FIG. 1), and allows the laser light IL, and the visible light VL1 and the reflected light VL2 thereof to be transmitted therethrough.

The objective lens 205 allows the distance measurement light RL1 reflected by the dichroic mirror 104 to be transmitted therethrough to the object to be processed 1 side while condensing the distance measurement light RL1. In addition, the objective lens 205 allows the reflected light RL2 of the distance measurement light RL1 reflected from the front surface 3 of the object to be processed 1 to be transmitted therethrough to the dichroic mirror 104 side. Here, the objective lens 205 allows the distance measurement light RL1 to be transmitted therethrough from an upper side to a lower side along the Z-axis direction, and allows the reflected light RL2 to be transmitted therethrough from the lower side to the upper side along the Z-axis direction.

The imaging lens 105 allows the reflected light RL2 that is reflected from the dichroic mirror 104 and is transmitted through the half mirror 103 to be transmitted therethrough to the reflective grating 106 side. Here, the imaging lens 105 allows the reflected light RL2 to be transmitted therethrough from one side to the other side along the X-axis direction. The imaging lens 105 forms an image at a position at which the distance measurement light RL1 or the reflected light RL2 are condensed by the objective lens 205 at an imaging position. In a case where the front surface 3 of the object to be processed 1 is located on a side opposite to the objective lens 205 with respect to a condensing point when the distance measurement light RL1 is condensed in the air by the objective lens 205, the condensing position is shown in the distance measurement light RL1. In a case where the front surface 3 of the object to be processed 1 is located on the condensing point when the distance measurement light RL1 is condensed in the air by the objective lens 205, the condensing position is shown at a boundary portion between the distance measurement light RL1 and the reflected light RL2. In a case where the front surface 3 of the object to be processed 1 is located on the objective lens 205 side with respect to the condensing point when the distance measurement light RL1 is condensed in the air by the objective lens 205, the condensing position is shown in the reflected light RL2. Note that, the imaging lens 105 may be constituted by one lens, or may be constituted by a plurality of lenses.

The reflective grating 106 reflects the reflected light RL2 transmitted through the imaging lens 105 to the light detection unit 107 side. For example, the reflective grating 106 is a blazed grating. Here, the reflective grating 106 reflects the reflected light RL2 incident from one side along the X-axis direction to an upper side along the Z-axis direction. The reflective grating 106 adjusts an optical path of the reflected light RL2 between the imaging lens 105 and the light detection unit 107 (details will be described later).

The light detection unit 107 detects the reflected light RL2 reflected from the reflective grating 106. For example, the light detection unit 107 is a one-dimensional photodiode array including a plurality of light detection channels arranged along the X-axis direction. A light reception surface 107a of the light detection unit 107 faces the reflective grating 106 side, and is located on a predetermined plane S. Here, the light reception surface 107a faces downward, and is located on a predetermined plane S orthogonal to the Z-axis direction. Note that, the light detection unit 107 may be a two-dimensional photodiode array or the like as long a plurality of light detection channels arranged along the X-axis direction are provided.

Figure 3:
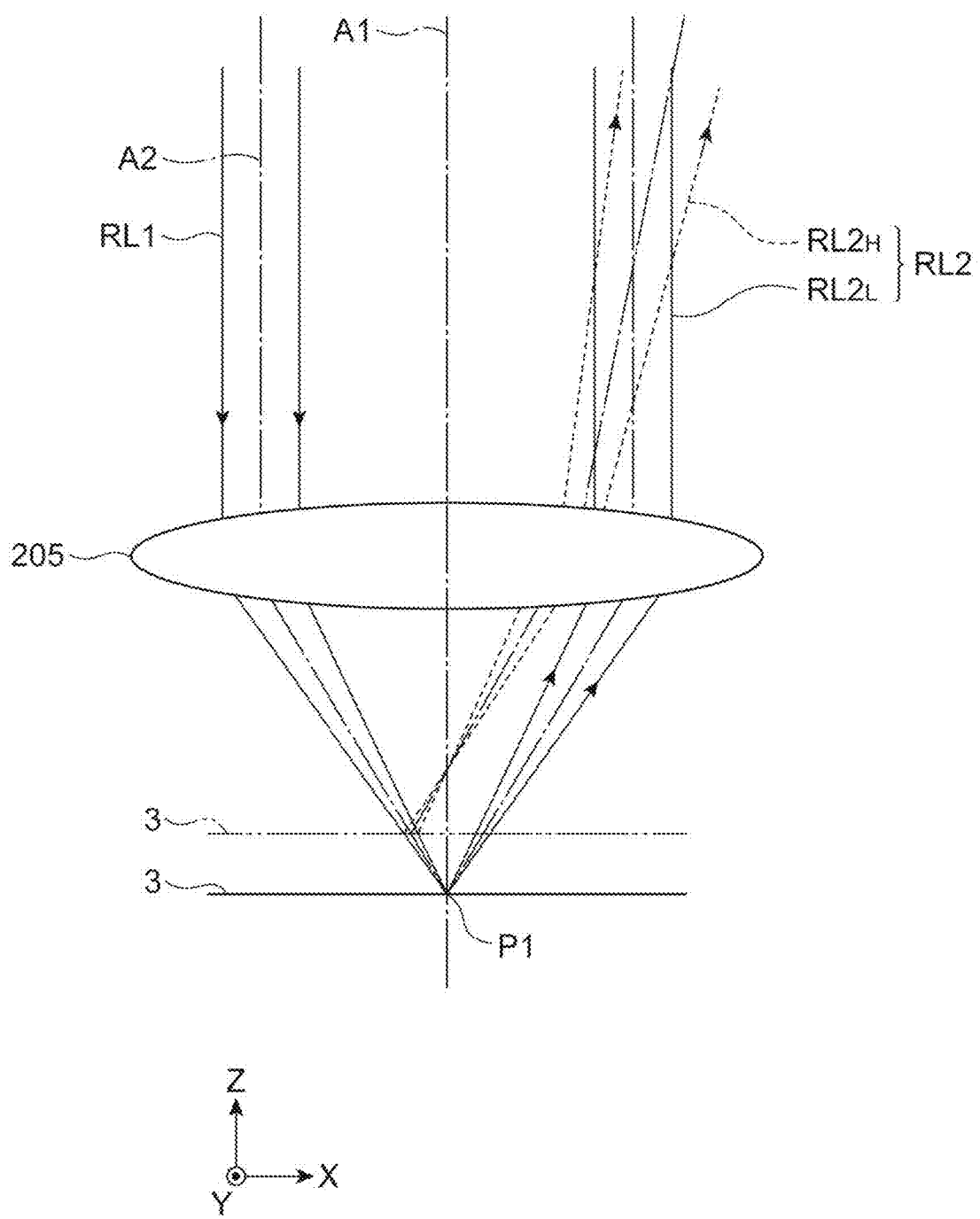
FIG. 3 is a configuration diagram of a part of the distance measurement unit illustrated in FIG. 2.

As illustrated in FIG. 3, the objective lens 205 allows the distance measurement light RL1 to be transmitted therethrough to the object to be processed 1 side in a state in which an optical path A2 of the distance measurement light RL1 is spaced apart from a central axis A1 of the objective lens 205. The optical path A2 of the distance measurement light RL1 incident to the objective lens 205 is parallel to the central axis A1 of the objective lens 205. The optical path A2 of the distance measurement light RL1 emitted from the objective lens 205 is inclined so that a condensing point P1 of the distance measurement light RL1 condensed by the objective lens 205 is located on the central axis A1 of the objective lens 205. Here, the optical path A2 of the distance measurement light RL1 incident to the objective lens 205 is spaced apart to one side in the X-axis direction from the central axis A1 of the objective lens 205.

According to this, as illustrated in FIG. 2 and FIG. 3, the optical path of the reflected light RL2 transmitting through the objective lens 205 varies in correspondence with the height of the front surface 3 of the object to be processed 1, and as a result, an incidence position of the reflected light RL2 on the light reception surface 107a of the light detection unit 107 varies in correspondence with the height of the front surface 3 of the object to be processed 1. Accordingly, the height of the front surface 3 of the object to be processed 1 can be measured on the basis of the incidence position of the reflected light RL2 on the light reception surface 107a of the light detection unit 107 (that is, on the basis of the position of the light detection channels to which the reflected light RL2 is incident).

For example, in a state in which the front surface 3 of the object to be processed 1 matches the condensing point P1 of the distance measurement light RL1 (a condensing point in a case where the distance measurement light RL1 is condensed in the air by the objective lens 205), the optical path of reflected light $RL2_L$ has a symmetrical relationship with the optical path of the distance measurement light RL1 with respect to the central axis A1 of the objective lens 205. In a state in which the front surface 3 of the object to be processed 1 is located on a further objective lens 205 side in comparison to the condensing point P1 of the distance measurement light RL1, an optical path of reflected light $RL2_M$ is formed after reflection on one side in the X-axis direction in comparison to the reflected light $RL2_L$. In a state in which the front surface 3 of the object to be processed 1 is located on a still further objective lens 205 side in comparison to the condensing point P1 of the distance measurement light RL1, an optical path of reflected light $RL2_H$ is formed after reflection on the one side in the X-axis direction in comparison to the reflected light $RL2_M$.

Figure 4:
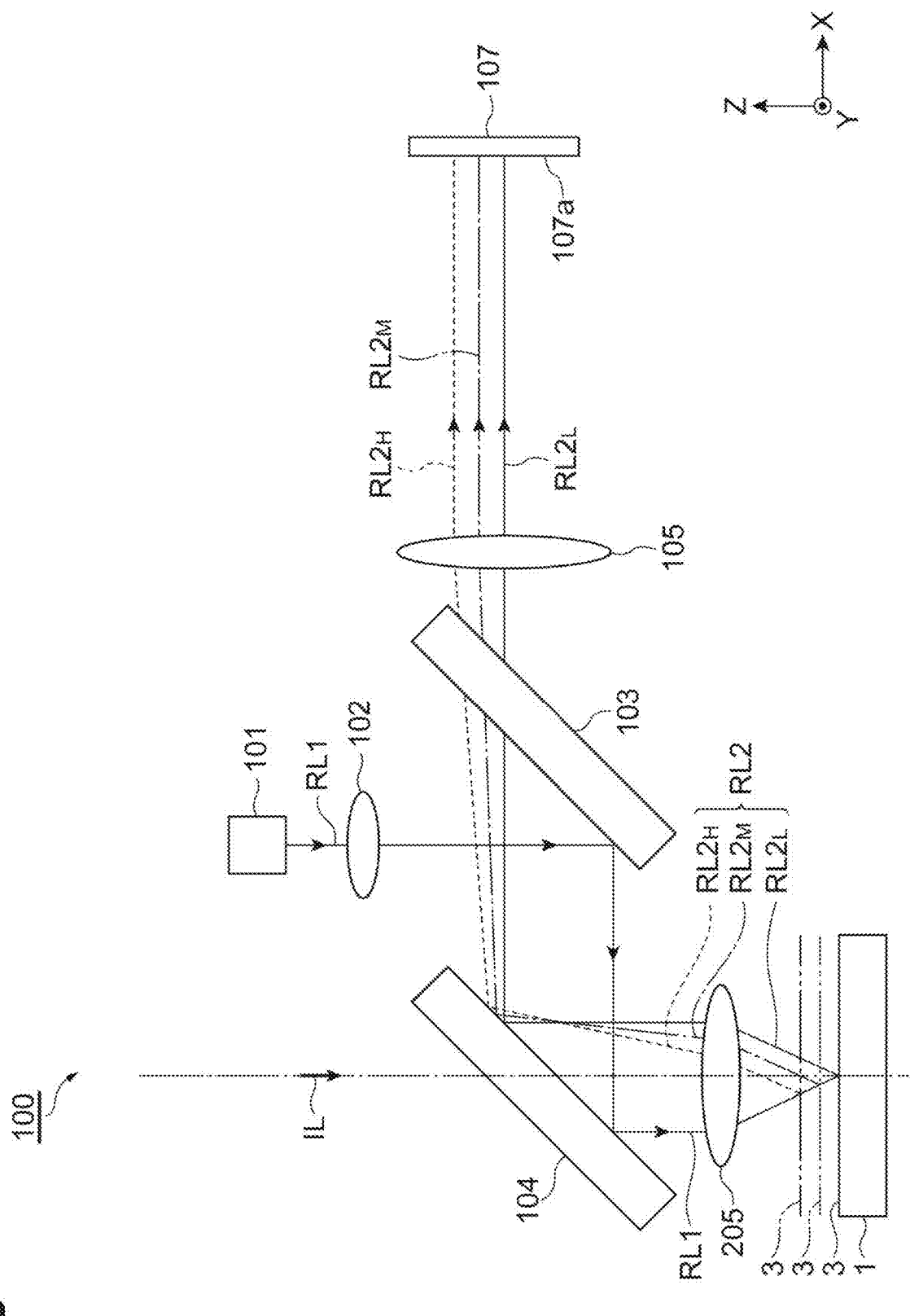
FIG. 4 is a configuration diagram of a distance measurement unit of a comparative example.
Figure 5:
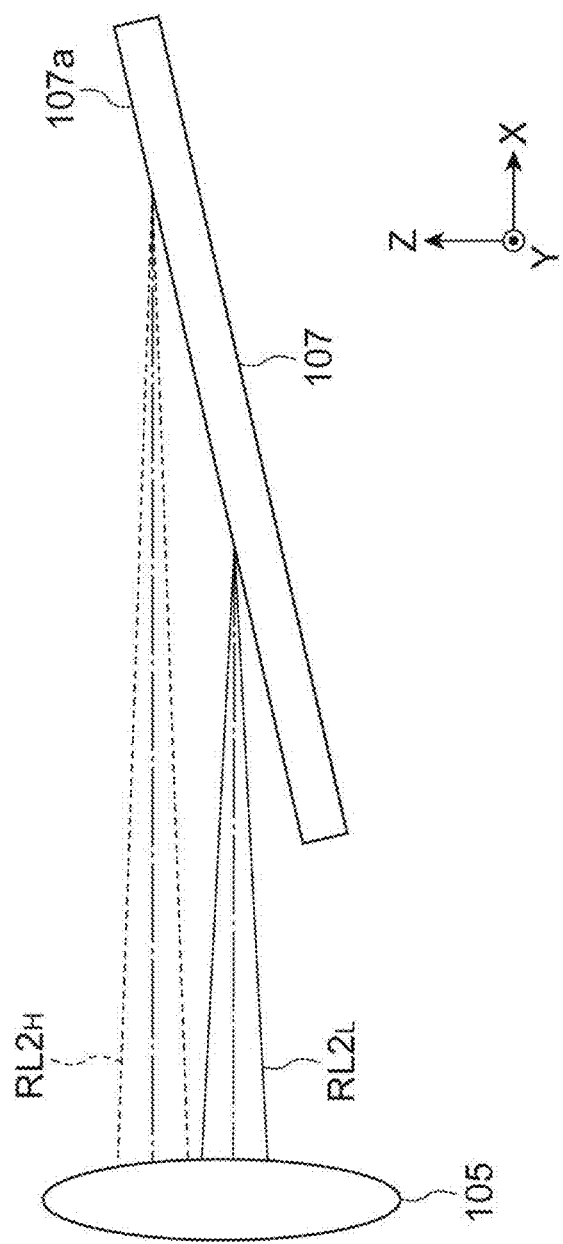
FIG. 5 is a configuration diagram of a part of the distance measurement unit of the comparative example.

Here, as illustrated in FIG. 3, since a state of convergence and divergence of the reflected light RL2 also varies in correspondence with the height of the front surface 3 of the object to be processed 1, the imaging position of the reflected light RL2 by the imaging lens 105 also varies in correspondence with the height of the front surface 3 of the object to be processed 1. Accordingly, as illustrated in FIG. 4, in a case where the distance measurement unit 100 is not provided with the reflective grating 106 that adjusts the optical path of the reflected light RL2, a spot size of the reflected light RL2 on the light reception surface 107a of the light detection unit 107 greatly varies in correspondence with the height of the front surface 3 of the object to be processed 1. As a result, there is a concern that measurement accuracy of the height of the front surface 3 of the object to be processed 1 may deteriorate. In addition, as illustrated in FIG. 5, even in a case where the light reception surface 107a of the light detection unit 107 is inclined to match the imaging position of the reflected light RL2 by the imaging lens 105, an incidence angle of the reflected light RL2 with respect to the light reception surface 107a increases, and thus a part of the reflected light RL2 is reflected from the light reception surface 107a or the spot size of the reflected light RL2 on the light reception surface 107a is enlarged. As a result, there is a concern that measurement accuracy of the height of the front surface 3 of the object to be processed 1 may deteriorate.

For example, when a focal length of the objective lens 205 is set to f1, a focal length of the imaging lens 105 is set to f2, a difference in the height of the front surface 3 of the object to be processed 1 in a direction parallel to the central axis A1 of the objective lens 205 is set to $\Delta Z$, and a difference in the imaging position of the reflected light RL2 in a direction parallel to the central axis of the imaging lens 105 is set to $\Delta X$, a relationship of $\Delta X/\Delta Z=4(f2/f1)^2$ is established in a case where the reflective grating 106 is not provided in the distance measurement unit 100. That is, as the focal length f1 of the objective lens 205 decreases, the difference $\Delta X$ in the imaging position of the reflected light RL2 increases, and the spot size of the reflected light RL2 on the light reception surface 107a is enlarged. As in the laser processing device 200, in a case where the modified region 7 is formed inside the object to be processed 1, since the numerical aperture of the objective lens 205 increases, and the focal length f1 of the objective lens 205 is shortened, it is particularly important to make a countermeasure for suppressing deterioration of the measurement accuracy of the height of the front surface 3 of the object to be processed 1.

As the countermeasure, as illustrated in FIG. 2, the distance measurement unit 100 is provided with the reflective grating 106 that adjusts the optical path of the reflected light RL2. The reflective grating 106 causes the reflected light RL2 to have an optical path length corresponding to the incidence position of the reflected light RL2 to the reflective grating 106 so as to adjust the optical path of the reflected light RL2.

In addition, the optical path of the reflected light RL2 transmitted through the imaging lens 105 (an optical path of main light beams of the reflected light RL2) varies along a predetermined plane (here, a plane orthogonal to the Y-axis direction) in correspondence with the height of the front surface 3 of the object to be processed 1. Here, the reflective grating 106 is disposed in such a manner that a plurality of grooves extend along a direction (here, the Y-axis direction) orthogonal to the predetermined plane. In addition, the reflective grating 106 is disposed in such a manner that as the optical path length of the reflected light RL2 from the imaging lens 105 to the imaging position is longer, the reflected light RL2 is reflected by the reflective grating 106 at a position that is further spaced apart from the imaging lens 105.

According to this, as the optical path length of the reflected light RL2 from the imaging lens 105 to the imaging position is longer, the optical path length of the reflected light RL2 from the imaging lens 105 to the light reception surface 107a of the light detection unit 107 is lengthened. For example, an optical path length of the reflected light $RL2_M$ from the imaging lens 105 to the light reception surface 107a of the light detection unit 107 is longer than an optical path length of the reflected light $RL2_L$ from the imaging lens 105 to the light reception surface 107a of the light detection unit 107. An optical path length of the reflected light $RL2_H$ from the imaging lens 105 to the light reception surface 107a of the light detection unit 107 is longer than the optical path length of the reflected light $RL2_M$ from the imaging lens 105 to the light reception surface 107a of the light detection unit 107.

However, astigmatism occurs in the reflected light RL2 that is imaged by the imaging lens 105 and is reflected by the reflective grating 106. Specifically, an imaging position of the reflected light RL2 that is imaged in the Y-axis direction is further spaced apart from the predetermined plane S at which the light reception surface 107a of the light detection unit 107 is located than an imaging position of the reflected light RL2 that is imaged in the X-axis direction. In the distance measurement unit 100, the reflective grating 106 adjusts the optical path of the reflected light RL2 so that the imaging position of the reflected light RL2 that is imaged in the X-axis direction approaches the predetermined plane S at which the light reception surface 107a of the light detection unit 107 is located.

In this manner, the reflective grating 106 adjusts the optical path of the reflected light RL2 so that the imaging position of the reflected light RL2 that is imaged in at least one direction (here, the X-axis direction) orthogonal to the incidence direction (here, the Z-axis direction) of the reflected light RL2 incident to the light detection unit 107 approaches the predetermined plane S orthogonal to the incidence direction. Note that, the reflective grating 106 includes the plurality of grooves extending along a direction (here, the Y-axis direction) that is parallel to the light reception surface 107a of the light detection unit 107 or is orthogonal to the one direction (here, the X-axis direction). In addition, the light detection unit 107 includes the plurality of light detection channels arranged along a direction parallel to the one direction (here, the X-axis direction).

Here, the "incidence direction of the reflected light RL2 incident to the light detection unit 107" represents an incidence direction of the reflected light RL2 that becomes a reference (for example, the reflected light $RL2_L$). In addition, "so that the imaging position of the reflected light RL2 approaches the predetermined plane S orthogonal to the incidence direction of the reflected light RL2 incident to the light detection unit 107" represents that the imaging position of the reflected light RL2 further approaches the predetermined plane S than a case where the reflective grating 106 is not provided in the distance measurement unit 100. That is, this represents that a difference in the imaging position of the reflected light RL2 in the incidence direction of the reflected light RL2 incident to the light detection unit 107 becomes less than ΔX described above (preferably, less than 10% of ΔX) in a region including the predetermined plane S.

In addition, the objective lens 205 and the imaging lens 105 are configured so that a direction of the optical path of the reflected light RL2 emitted from the imaging lens 105 (an optical path of main light beams of the reflected light RL2) becomes constant. Here, as illustrated in (a) of FIG. 6, an optical path length between the objective lens 205 and the imaging lens 105 is set to the sum of the focal length f1 of the objective lens 205 and the focal length f2 of the imaging lens 105. That is, a focal position of the objective lens 205 on the imaging lens 105 side and a focal position of the imaging lens 105 on the objective lens 205 side match each other. According to this, even when the height of the front surface 3 of the object to be processed 1 varies, the direction of the optical path of the reflected light RL2 emitted from the imaging lens 105 becomes constant, and as a result, as illustrated in (b) of FIG. 6, the height of the front surface 3 of the object to be processed 1 and a position of the optical detection channels to which the reflected light RL2 is incident in the light detection unit 107 have a linear relationship. Note that, in (a) of FIG. 6, illustration of the distance measurement light source 101, the collimate lens 102, the half mirror 103, the dichroic mirror 104, and the like is omitted, and the configuration of the distance measurement unit 100 is simplified.

Figure 7:
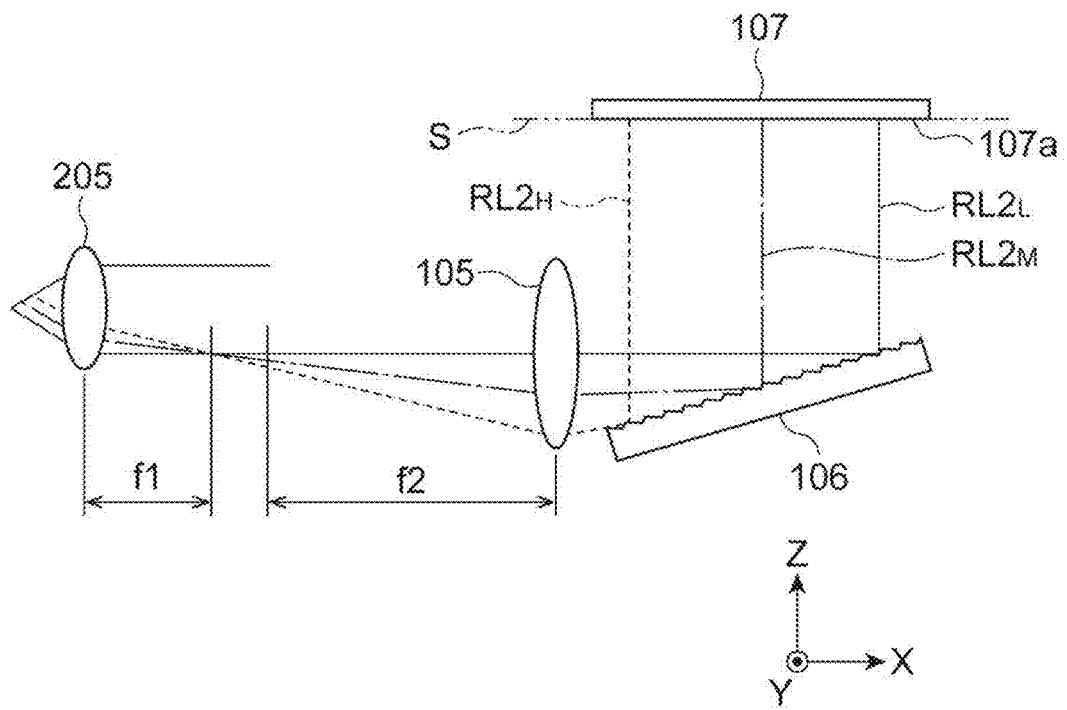
FIG. 7 is a diagram for describing an optical path of distance measurement light in a distance measurement unit of a modification example.
Figure 7:
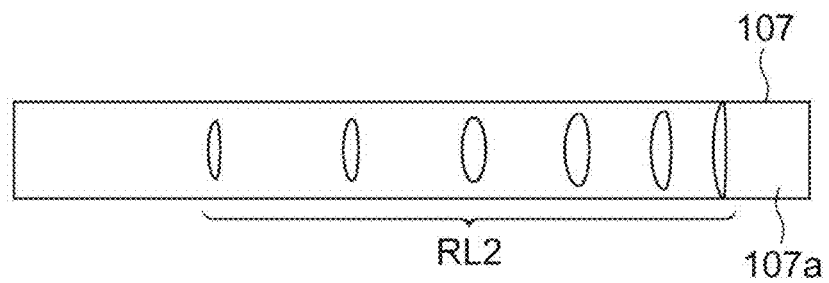
Figure 7:
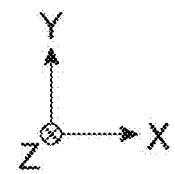

In contrast, as illustrated in (a) of FIG. 7, when the optical path length between the objective lens 205 and the imaging lens 105 is greater (or smaller) than the sum of the focal length f1 of the objective lens 205, and the focal length f2 of the imaging lens 105, the direction of the optical path of the reflected light RL2 emitted from the imaging lens 105 varies in correspondence with the height of the front surface 3 of the object to be processed 1, and as a result, as illustrated in (b) of FIG. 7, the height of the front surface 3 of the object to be processed 1 and the position of the light detection channels to which the reflected light RL2 is incident in the light detection unit 107 have a non-linear relationship. However, even in this case, for example, when the controller 230 retains the relationship between the front surface 3 of the object to be processed 1 and the position of the light detection channels in advance, and the controller 230 refers to the relationship, the height of the front surface 3 of the object to be processed 1 can be measured with sufficient accuracy. Note that, in (a) of FIG. 7, illustration of the distance measurement light source 101, the collimate lens 102, the half mirror 103, the dichroic mirror 104, and the like is omitted, and the configuration of the distance measurement unit 100 is simplified.

Figure 6:
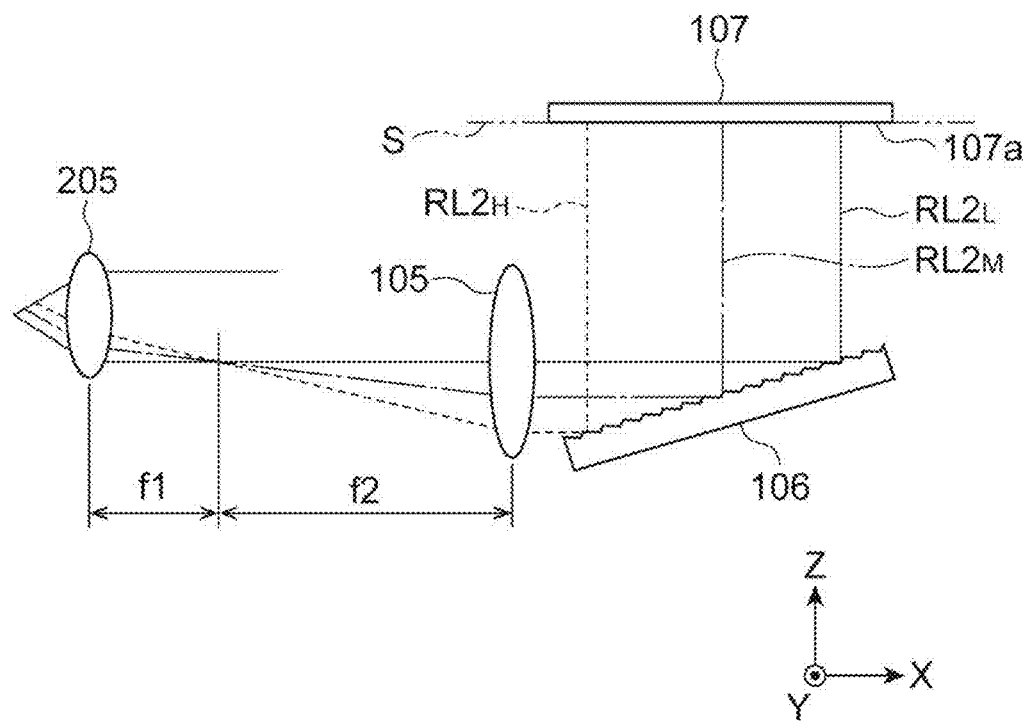
FIG. 6 is a diagram for describing an optical path of distance measurement light in the distance measurement unit illustrated in FIG. 2.
Figure 6:
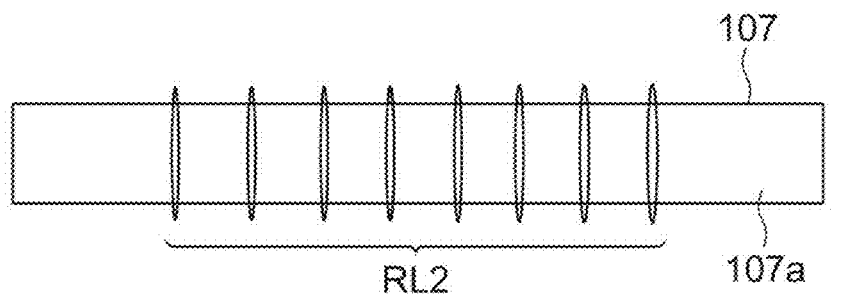

In addition, as illustrated in (b) of FIG. 6, an image of the reflected light RL2 on the light reception surface 107a of the light detection unit 107 shows an elongated shape (here, an elliptical shape) in which a direction (here, the Y-axis direction) orthogonal to the one direction (one direction in which the reflected light RL2 is imaged to approach the predetermined plane S) is set as a longitudinal direction. According to this, a deviation of the light reception surface 107a of the light detection unit 107 in the longitudinal direction of the image of the reflected light RL2 is permitted, and arrangement accuracy of respective configurations is mitigated. Note that, the reason why the image of the reflected light RL2 on the light reception surface 107a of the light detection unit 107 shows the elongated shape in which the direction orthogonal to the one direction is set as the longitudinal direction is that astigmatism occurs in the reflected light RL2 that is imaged by the imaging lens 105 and is reflected by the reflective grating 106.

Figure 8:
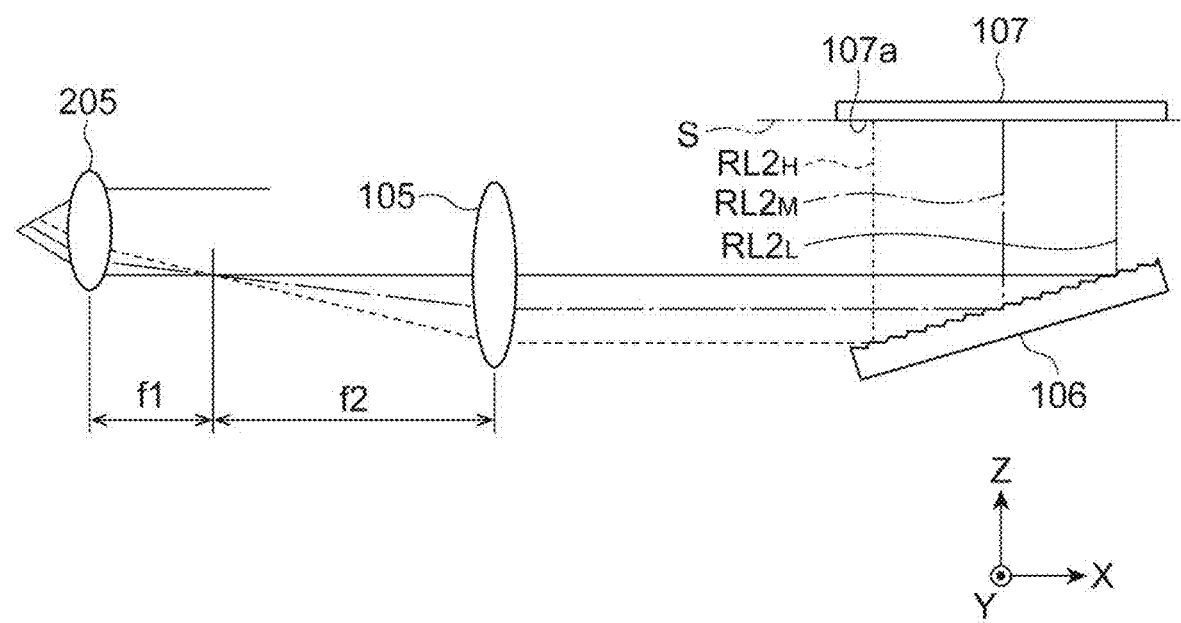
FIG. 8 is a diagram for describing the optical path of the distance measurement light in the distance measurement unit of the modification example.
Figure 8:
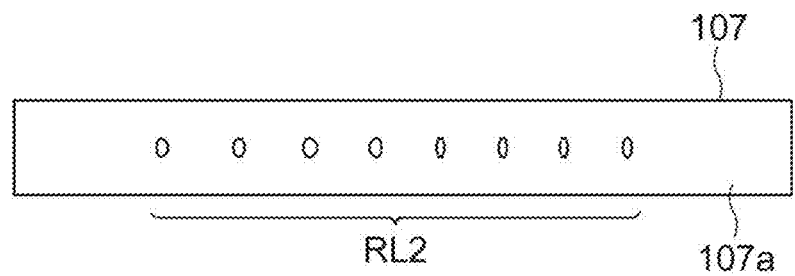
Figure 8:
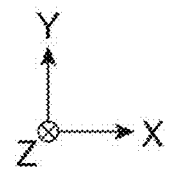

In contrast, for example, as illustrated in (a) of FIG. 8, when the optical path length between the imaging lens 105 and the reflective grating 106 is lengthened, and the optical path length between the reflective grating 106 and the light detection unit 107 is shortened, as illustrated in (b) of FIG. 8, the image of the reflected light RL2 on the light reception surface 107a of the light detection unit 107 becomes a dot shape. However, even in this case, the height of the front surface 3 of the object to be processed 1 can be measured with sufficient accuracy. In this manner, it is possible to adjust the shape of the image of the reflected light RL2 on the light reception surface 107a of the light detection unit 107 by adjusting at least one of the optical path length between the imaging lens 105 and the reflective grating 106, and the optical path length between the reflective grating 106 and the light detection unit 107. Note that, in (a) of FIG. 8, illustration of the distance measurement light source 101, the collimate lens 102, the half mirror 103, the dichroic mirror 104, and the like is omitted, and the configuration of the distance measurement unit 100 is simplified.

In the distance measurement unit 100 configured as described above, the reflected light RL2 is detected as follows. As illustrated in FIG. 2, the distance measurement light RL1 output from the distance measurement light source 101 is collimated by the collimate lens 102. The collimated distance measurement light RL1 is reflected from the half mirror 103 and the dichroic mirror 104 in this order, and is incident to the objective lens 205. The distance measurement light RL1 incident to the objective lens 205 is condensed by the objective lens 205 and is emitted to the front surface 3 of the object to be processed 1. The reflected light RL2 of the distance measurement light RL1 reflected from the front surface 3 of the object to be processed 1 is transmitted through the objective lens 205, and is reflected from the dichroic mirror 104. The reflected light RL2 reflected from the dichroic mirror 104 is transmitted through the half mirror 103 and is imaged by the imaging lens 105, and is reflected from the reflective grating 106. The reflected light RL2 reflected from the reflective grating 106 is incident to the light detection unit 107 and is detected by the light detection unit 107.

[Operation and Effect]

In the distance measurement unit 100, in a state in which the optical path A2 of the distance measurement light RL1 is spaced apart from the central axis A1 of the objective lens 205, the objective lens 205 allows the distance measurement light RL1 to be transmitted therethrough to the object to be processed 1 side. Accordingly, a position at which the reflected light RL2 reflected from the front surface 3 of the object to be processed 1 is incident to the light reception surface 107a of the light detection unit 107 varies in correspondence with the height of the front surface 3 of the object to be processed 1. Accordingly, the height of the front surface 3 of the object to be processed 1 can be measured on the basis of the incidence position of the reflected light RL2 on the light reception surface 107a of the light detection unit 107. At this time, even when a part of the distance measurement light RL1 is reflected from another surface (a surface on a light emission side in the object to be processed 1, or the like) of the object to be processed 1, the reflected light reflected from the other surface of the object to be processed 1 is spatially separated from the reflected light RL2 reflected from the front surface 3 of the object to be processed 1, and thus it is possible to suppress unnecessary reflected light from being superimposed on the reflected light RL2 to be detected. In addition, in the distance measurement unit 100, the reflective grating 106 adjusts the optical path of the reflected light RL2 so that the imaging position of the reflected light RL2 that is imaged in one direction (here, the X-axis direction) orthogonal to the incidence direction of the reflected light RL2 incident to the light detection unit 107 approaches the predetermined plane S orthogonal to the incidence direction, and the light reception surface 107a of the light detection unit 107 is located on the predetermined plane S. According to this, the height of the front surface 3 of the object to be processed 1 can be measured in a uniform state. When the reflective grating 106 is not provided, since a position at which the reflected light RL2 is transmitted through each of the objective lens 205 and the imaging lens 105 varies in correspondence with the height of the front surface 3 of the object to be processed 1, the position at which the reflected light RL2 is imaged by the imaging lens 105 greatly varies in correspondence with the height of the front surface 3 of the object to be processed 1. As a result, there is a concern that the height of the front surface 3 of the object to be processed 1 cannot be measured with accuracy depending on the height. As described above, according to the distance measurement unit 100, the height of the front surface 3 of the object to be processed 1 can be measured with accuracy.

In addition, in the distance measurement unit 100, the reflective grating 106 adjusts the optical path of the reflected light RL2 between the imaging lens 105 and the light detection unit 107. According to this, respective configurations can be arranged with efficiency.

In addition, in the distance measurement unit 100, the reflective grating 106 includes a plurality of grooves extending along a direction that is parallel to the light reception surface 107a of the light detection unit 107 or orthogonal to one direction (one direction in which the reflected light RL2 is imaged to approach the predetermined plane S). According to this, it is possible to make the imaging position of the reflected light RL2 imaged in at least one direction orthogonal to the incidence direction of the reflected light RL2 incident to the light detection unit 107 be close to the predetermined plane S that intersects the incidence direction in an easy and reliable manner.

In addition, in the distance measurement unit 100, the light detection unit 107 includes a plurality of light detection channels arranged along a direction parallel to one direction (one direction in which the reflected light RL2 is imaged to approach the predetermined plane S). According to this, the reflected light RL2 is imaged in one direction orthogonal to the incidence direction, and thus the height of the front surface 3 of the object to be processed 1 can be measured with accuracy on the basis of the position of the light detection channels to which the reflected light RL2 is incident.

In addition, in the distance measurement unit 100, the objective lens 205 and the imaging lens 105 are configured so that the direction of the optical path of the reflected light RL2 emitted from the imaging lens 105 becomes constant. According to this, a relationship between the height of the front surface 3 of the object to be processed 1 and the position of the light detection channels to which the reflected light RL2 in the light detection unit 107 is incident can be made to be linear.

In addition, in the distance measurement unit 100, an image of the reflected light RL2 on the light reception surface 107a of the light detection unit 107 shows an elongated shape in which a direction orthogonal to one direction (one direction in which the reflected light RL2 is imaged to approach the predetermined plane S) is set as a longitudinal direction. According to this, a deviation of the light reception surface 107a of the light detection unit 107 in the longitudinal direction of the image of the reflected light RL2 can be permitted, and thus the height of the front surface 3 of the object to be processed 1 can be measured with accuracy while mitigating arrangement accuracy of respective configurations.

In addition, in the laser processing device 200, as described above, the height of the front surface 3 of the object to be processed 1 can be measured with accuracy. In addition, the objective lens 205 is moved along a central axis A1 thereof in correspondence with the height of the front surface 3 of the object to be processed 1, and thus a condensing point P of the laser light IL can match a desired position in the object to be processed 1. In addition, measurement of the height of the front surface 3 of the object to be processed 1 and positioning of a condensing point P of the laser light IL with respect to the object to be processed 1 can be performed without limitation to a state in which a condensing point P1 of the distance measurement light RL1 by the objective lens 205 is located on the front surface 3 of the object to be processed 1.

Modification Example

The present disclosure is not limited to the above-described embodiment. For example, in the above-described embodiment, the dichroic mirror 104 allows the laser light IL to be transmitted therethrough and reflects the distance measurement light RL1 (including the reflected light RL2 thereof), but an optical element that allows one side of the laser light IL and the distance measurement light RL1 to be transmitted therethrough, and reflects the other side of the laser light IL and the distance measurement light RL1 may be used instead of the dichroic mirror 104.

In addition, in the above-described embodiment, as the optical path adjustment unit that adjusts the optical path of the reflected light RL2, the reflective grating 106 disposed between the imaging lens 105 and the light detection unit 107 is used. However, another configuration may be employed as long as the optical path of the reflected light RL2 can be adjusted so that the imaging position of the reflected light RL2 approaches the predetermined plane S. Examples of the configuration include a spatial light modulators, a digital mirror device, a transmissive grating, and a prism. A cylindrical lens may be provided so that an image of the reflected light RL2 on the light reception surface 107*a* of the light detection unit 107 shows an elongated shape in which a direction orthogonal to one direction (one direction in which the reflected light RL2 is imaged to approach the predetermined plane S) is set as a longitudinal direction.

Figure 9:
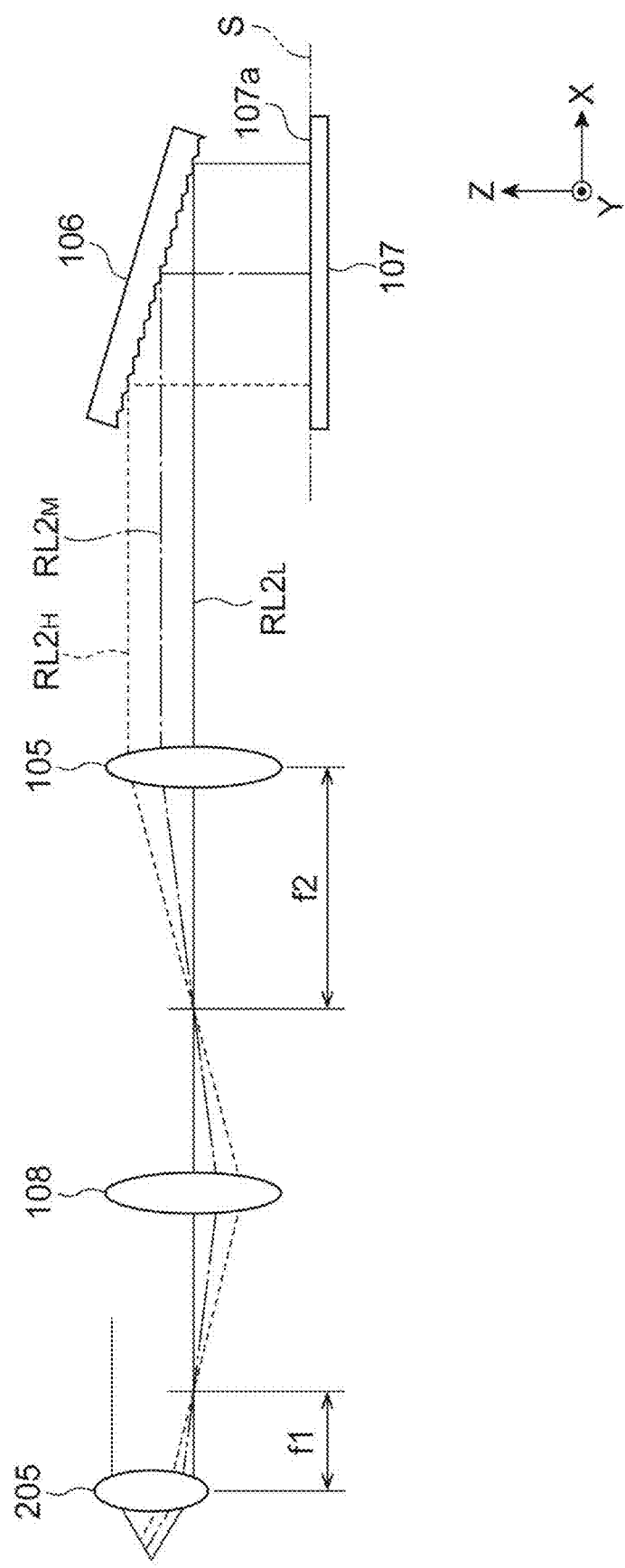
FIG. 9 is a diagram for describing the optical path of the distance measurement light in the distance measurement unit of the modification example.

In addition, as illustrated in FIG. 9, it is possible to employ a configuration in which a relay lens 108 is disposed on the optical path between the objective lens 205 and the imaging lens 105, and thus in the objective lens 205 and the imaging lens 105, a direction of the optical path of the reflected light RL2 emitted from the imaging lens 105 (an optical path of main light beams of the reflected light RL2) becomes constant. In this case, it can be understood that the imaging lens is constituted by the relay lens 108 and the imaging lens 105. The relay lens 108 may be constituted by one lens or may be constituted by a plurality of lenses. Note that, in FIG. 9, illustration of the distance measurement light source 101, the collimate lens 102, the half mirror 103, the dichroic mirror 104, and the like is omitted, and the configuration of the distance measurement unit 100 is simplified.

In addition, when the distance measurement light RL1 is transmitted through the objective lens 205, a spaced-apart distance between the optical path A2 of the distance measurement light RL1 and the central axis A1 of the objective lens 205 may be adjusted. As an example, the position of the half mirror 103 illustrated in FIG. 2 may be adjusted to adjust the spaced-apart distance between the optical path A2 of the distance measurement light RL1 and the central axis A1 of the objective lens 205. It is possible to adjust a measurement range in the height of the front surface 3 of the object to be processed 1, and detection sensitivity in the light detection unit 107 by adjusting the distance.

In addition, in the above-described embodiment, the light irradiation device and the object are the laser processing device 200 and the object to be processed 1, respectively, and the irradiation light source that outputs the irradiation light is the laser light source 202 that outputs the laser light IL. However, in a case where the light irradiation device is the laser processing device, surface processing or the like may be carried out without limitation to internal processing.

In addition, the light irradiation device and the object may be an observation device (a microscope or the like) and an observation object, respectively. In this case, the irradiation light source that outputs the irradiation light may be an observation light source that outputs the observation light.

In addition, in the above-described embodiment, the light reception surface 107*a* of the light detection unit 107 is located on the predetermined plane S, but the light reception surface 107*a* of the light detection unit 107 may be located to follow along the predetermined plane S. For example, even when an angle is made between the light reception surface 107*a* of the light detection unit 107 and the predetermined plane S, in a case where the angle is less than 5°, the height of the front surface 3 of the object to be processed 1 can be measured with sufficient accuracy.

In addition, in the above-described embodiment, the height of the front surface 3 of the object to be processed 1 is measured, but the height of a rear surface of the object to be processed 1, or the like can also be measured. That is, according to the invention, various surfaces of the object can be set as the surface to be measured without limitation to the front surface on an incidence side of the distance measurement light in the object. The reason for this is that reflected light beams reflected from respective surfaces are spatially separated from each other.

In addition, in the above-described embodiment, the predetermined plane S is a surface orthogonal to the incidence direction of the reflected light RL2 incident to the light detection unit 107, but the predetermined plane S may be a surface that intersects the incidence direction, for example, a surface inclined with respect to the incidence direction, for example, at an angle of 30° or less.

REFERENCE SIGNS LIST

1: object to be processed (object), 3: front surface (surface to be measured), 100: distance measurement unit, 101: distance measurement light source, 104: dichroic mirror (optical element), 105: imaging lens, 106: reflective grating (optical path adjustment unit), 107: light detection unit, 107*a*: light reception surface, 200: laser processing device (light irradiation device), 201: stage (support unit), 202: laser light source (irradiation light source), 205: objective lens, 207: drive unit, 230: controller, IL: laser light (irradiation light), RL1: distance measurement light, RL2: reflected light.

The invention claimed is:
1. A distance measurement unit comprising:
a distance measurement light source that outputs distance measurement light that is laser light;
an objective lens through which the distance measurement light and reflected light are transmitted, the reflected light being the distance measurement light reflected from a surface to be measured of an object;
an imaging lens through which the reflected light is transmitted and which forms an image at an imaging position, the image being an image at a position at which the distance measurement light or the reflected light is condensed by the objective lens;
an optical path adjustment unit that adjusts an optical path of the reflected light; and
a light detection unit that detects the reflected light,
wherein the objective lens allows the distance measurement light to be transmitted therethrough to the object side in a state in which an optical path of the distance measurement light is spaced apart from a central axis of the objective lens,
the optical path adjustment unit adjusts the optical path of the reflected light so that the imaging position of the reflected light that is imaged in at least one direction orthogonal to an incidence direction of the reflected light incident to the light detection unit approaches a predetermined plane that intersects the incidence direction, and
a light reception surface of the light detection unit is located to follow along the predetermined plane.

2. The distance measurement unit according to claim 1, wherein the optical path adjustment unit adjusts the optical path of the reflected light between the imaging lens and the light detection unit.

3. The distance measurement unit according to claim 2, wherein the optical path adjustment unit is a reflective grating including a plurality of grooves extending along a direction that is parallel to the light reception surface and orthogonal to the one direction.

4. The distance measurement unit according to claim 3, wherein the light detection unit includes a plurality of light detection channels arranged along a direction parallel to the one direction.

5. The distance measurement unit according to claim 3, wherein the objective lens and the imaging lens are configured so that a direction of the optical path of the reflected light emitted from the imaging lens becomes constant.

6. The distance measurement unit according to claim 3, wherein an image of the reflected light on the light reception surface shows an elongated shape in which a direction orthogonal to the one direction is set as a longitudinal direction.

7. A light irradiation device comprising:
a support unit that supports an object;
an irradiation light source that outputs irradiation light;
a distance measurement light source that outputs distance measurement light that is laser light;
an optical element through which one side of the irradiation light and the distance measurement light is transmitted and from which the other side of the irradiation light and the distance measurement light is reflected;
an objective lens through which the irradiation light, the distance measurement light, and reflected light are transmitted, the reflected light being the distance measurement light reflected from a surface to be measured of the object;
an imaging lens through which the reflected light is transmitted and which forms an image at an imaging position, the image being an image at a position at which the distance measurement light or the reflected light is condensed by the objective lens;
an optical path adjustment unit that adjusts an optical path of the reflected light;
a light detection unit that detects the reflected light;
a drive unit that moves the objective lens along a central axis of the objective lens; and
a controller that drives the drive unit on the basis of an electrical signal output from the light detection unit,
wherein the objective lens allows the distance measurement light to be transmitted therethrough to the object side in a state in which an optical path of the distance measurement light is spaced apart from the central axis of the objective lens,
the optical path adjustment unit adjusts the optical path of the reflected light so that the imaging position of the reflected light that is imaged in at least one direction orthogonal to an incidence direction of the reflected light incident to the light detection unit approaches a predetermined plane that intersects the incidence direction, and
a light reception surface of the light detection unit is located to follow along the predetermined plane.

* * * * *